US012188493B2

(12) United States Patent
Darnell et al.

(10) Patent No.: US 12,188,493 B2
(45) Date of Patent: Jan. 7, 2025

(54) CONTROL SYSTEM FOR ACTUATING LIFTING FUNCTION

(71) Applicant: Danfoss Power Solutions Inc., Ames, IA (US)

(72) Inventors: Aaron Darnell, Nordborg (DK); Zhekang Du, Nordborg (DK); Simon Nielsen, Nordborg (DK)

(73) Assignee: Danfoss Power Solutions Inc., Ames, IA (US)

( * ) Notice: Subject to any disclaimer, the term of this patent is extended or adjusted under 35 U.S.C. 154(b) by 0 days.

(21) Appl. No.: 17/999,809

(22) PCT Filed: May 27, 2021

(86) PCT No.: PCT/US2021/034476
§ 371 (c)(1),
(2) Date: Nov. 23, 2022

(87) PCT Pub. No.: WO2021/242995
PCT Pub. Date: Dec. 2, 2021

(65) Prior Publication Data

US 2023/0175531 A1 Jun. 8, 2023

Related U.S. Application Data

(60) Provisional application No. 63/030,349, filed on May 27, 2020.

(51) Int. Cl.
*F15B 11/08* (2006.01)
*F15B 13/02* (2006.01)
(Continued)

(52) U.S. Cl.
CPC ............ *F15B 11/08* (2013.01); *F15B 13/024* (2013.01); *F15B 13/042* (2013.01);
(Continued)

(58) Field of Classification Search
CPC ..... F15B 11/08; F15B 11/0423; F15B 11/042; F15B 2211/45; F15B 13/0442; B66F 11/042
See application file for complete search history.

(56) References Cited

U.S. PATENT DOCUMENTS 5,289,679 A 3/1994 Yasuda
5,522,479 A 6/1996 Jo
(Continued)

FOREIGN PATENT DOCUMENTS

CN 103480963 A 1/2014

OTHER PUBLICATIONS

CN103480963A—English Translation Abstract.
International Search Report and Written Opinion; PCT/US2021/034476; mailed Sep. 10, 2021.

*Primary Examiner* — Kenneth Bomberg
*Assistant Examiner* — Daniel S Collins
(74) *Attorney, Agent, or Firm* — ZarleyConley PLC

(57) ABSTRACT

A hydraulic control system for linear actuation that provides a bypass flow during startup of a lifting command, provides a split flow between a cylinder and a reservoir once a minimum operating speed of a pump has been reached, and provides complete flow to a cylinder after the minimum operating speed of the pump has been reached. This is achieved through control of a flow control valve and a proportional flow control valve by a processor.

20 Claims, 8 Drawing Sheets

(51) Int. Cl.
*F15B 13/042* (2006.01)
*F15B 13/044* (2006.01)

(52) U.S. Cl.
CPC ........ *F15B 13/0442* (2013.01); *F15B 13/025* (2013.01); *F15B 2211/20515* (2013.01); *F15B 2211/31529* (2013.01); *F15B 2211/45* (2013.01); *F15B 2211/6346* (2013.01)

(56) References Cited

U.S. PATENT DOCUMENTS

| | | | |
|---|---|---|---|
| 2009/0026020 | A1 | 1/2009 | Izuhara |
| 2011/0083762 | A1 | 4/2011 | Payne |
| 2014/0076153 | A1 | 3/2014 | Brockmann |
| 2016/0195083 | A1 | 7/2016 | Lingenfelter et al. |

CONTROL SYSTEM FOR ACTUATING LIFTING FUNCTION

BACKGROUND OF THE INVENTION

This invention is directed toward a hydraulic control system for a linear actuation such as actuating the lifting function of a scissor lift device and the like. More specifically, and without limitation, this invention relates to a control system for lifting for a startup from zero pump speed and command lift speeds both below and above the minimum operating speed of the pump.

Scissor lifts are well-known in the art and have a primary function of lifting and lowering an operator platform. The platform is supported by an assembly of linkages that extend and retract in "Scissor" fashion, and actuation force is typically provided by a hydraulic cylinder within the assembly.

Currently, electric motors have been introduced to propel the scissor lift 1 by actuating the lift cylinder with a hydraulic power pack 2 that is mounted directly to the cylinder body. The power pack is a complete, self-contained hydraulic system that includes a prime mover, reservoir, pump, and in some cases, valves and filtration. An example of such a cylinder-mounted hydraulic power pack is shown in FIG. 2 and a hydraulic schematic representing this assembly is shown in FIG. 3. The electric prime mover and electric solenoid valves in the shown power pack are typically controlled directly or indirectly by a microcontroller with programmable software logic. FIG. 3 shows the system in a de-energized, idle state. In this idle state the hydraulic pump is not being driven and the scissor lift platform is stationary and does not raise or lower.

In an operational state for lifting, as shown in FIG. 4, the solenoid of the proportional control valve 34 is energized, and the valve is shifted to its fully closed position. As the pump 14 is driven flow is generated, and as shown by the arrows, delivered to the directional control valve 22 and through a check valve to the cap end of the cylinder 16. As the cylinder rod extends, flow is pushed out from the rod end of the cylinder 16 and delivered to the tank 26. So long as flow is generated by the pump 14 and does not exceed the pressure setting of the relief valve 32, the cylinder 16 extends. The extension rate of the cylinder 16 is directly proportional to the flow rate from the pump 14. The flow rate from the fixed-displacement pump 14 is directly proportional to its speed. Therefore, in this system, the extension rate of the cylinder 16 is controlled directly by controlling the speed of the pump's prime mover.

To lower the platform, the system, as shown in FIG. 5, the directional control valve 22 is energized to its open position to allow flow back from the cylinder 16. The proportional flow control valve 34 will either be de-energized to its fully-open position or energized to some partially-open position. The position of the proportional flow control valve 34 corresponds directly to the flow rate through it and the valve downstream of the flow control valve provides pressure compensation. During lowering, the pump 14 is not driven and does not produce flow.

The weight of the platform and the scissor assembly applies a force onto the cylinder rod in the direction of retraction. With the directional control valve 22 and flow control valve 34 both open for lowering, flow is forced out of the cap end of the cylinder 16, through valves 22 and 34, and into the reservoir 26 and rod end of the cylinder 16 as illustrated by the arrows. The retraction rate of the cylinder 16 is controlled only by the position of the proportional control valve 34, the more open the valve, the faster the flow rate through it and the faster the retraction rate.

The extension rate of the cylinder 16 is controlled directly by controlling the speed of the pump's prime mover. In theory, 0-100% of the pump speed should provide 0-100% of the cylinder extension rate. However, for many pumps, such as external gear pumps, which are commonly used for power packs, a minimum operating speed is specified in order to avoid damage and reduced lifetime. The minimum operating speed specification has to do with the ability of the pump to maintain an appropriate oil film in the hydrodynamic journal bearings. This minimum speed is often a function of pump pressure as well, where higher pressures require even higher minimum speeds. This means that there is an operating envelope for the pump where a normal lifetime can be expected, as illustrated in FIG. 6.

As an example, a gear pump may have the following values for the variables shown on the plot in FIG. 6:

N1 speed=800 rpm
N2 speed=1000 rpm
Max speed=4000 rpm
P1 pressure=150 bar
Rated pressure=250 bar This means that the bottom 20-25% of the full pump speed range and the full cylinder extension speed range is not within the pump operating envelope, depending on the pressure level. Desired is to have a full cylinder extension or platform lifting speed control from 0-100% without violating the operational specifications of the pump.

An objective of the present invention is to provide a hydraulic control system for linear actuation to control the system state during startup of a lifting command.

Another objective of the present invention is to provide a hydraulic control system for linear actuation to a system state during operation at commanded lifting speeds requiring pump speeds less than the minimum pump operating speed.

These and other objectives will be apparent to one having ordinary skill in the art based upon the following written description, drawings and claims.

SUMMARY OF THE INVENTION

A hydraulic control system for linear actuation includes an electric motor connected to a hydraulic pump. A hydraulic cylinder is also connected to the hydraulic pump via a flow line. Connected to the flow line between the pump and the cylinder is a pressure transducer, a pressure control valve, and a check valve. A tank is connected to the pump and to the cylinder by a return line.

A control or relief valve is connected to the flow line between the pump and the check valve and also to the flow line. A proportional control flow valve is connected to the flow line between the check valve and the control valve and is also connected to the return line. The proportional control valve is connected to a processor having software to the control the system state during startup of a lifting command and during operation at commanded lifting speeds requiring pump speeds less than the minimum pump operating speed.

For example, before energizing the proportional flow control valve to a closed position pump speed is increased to a level corresponding to a greater value of a command cylinder extension rate or a minimum allowed pump speed. As a result pump flow is bypassed to the tank during startup through the proportional flow control valve.

Once an operating speed for the pump has been reached, the proportional control valve is energized to become partially opened to a position that bypasses a fraction of the pump flow away from the cylinder directly to the tank. The remaining fraction of pump flow proceeds to the cylinder. As a result, at commanded speeds requiring less than a minimum operating speed of the pump, flow is applied regardless of whether speed needs to be ramped up or ramped down.

Once a minimum operating speed for the pump has been reached the proportional control valve is energized to become completely closed in order to direct all pump flow to the cylinder. The proportional control valve is ramped closed at a configurable rate to produce a desired acceleration rate of the cylinder. Also, as the proportional control valve closes, pump speed increases to a level required based on a lifting speed command.

DETAILED DESCRIPTION

Figure 1:
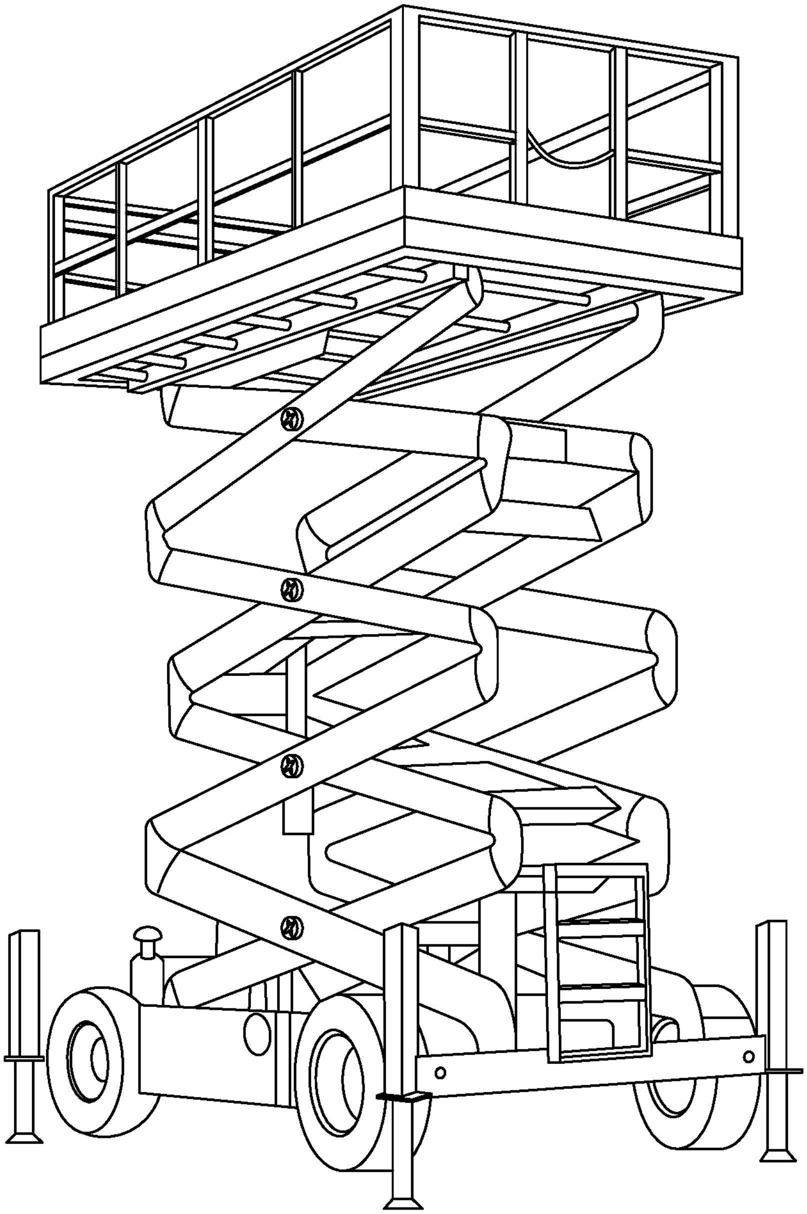
FIG. 1 is a perspective view of a scissor assembly.
Figure 2:
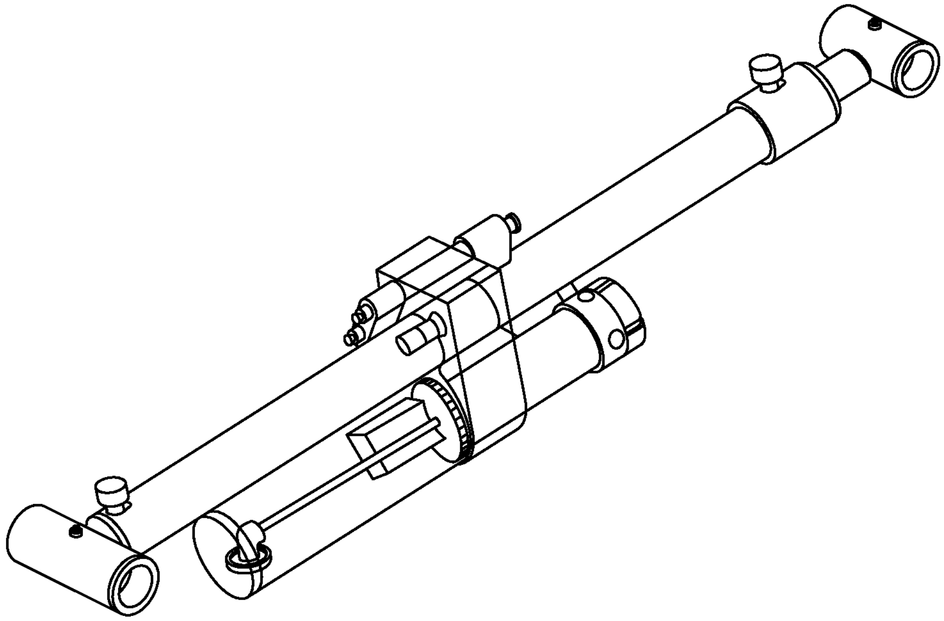
FIG. 2 is a perspective view of a hydraulic power pack.
Figure 3:
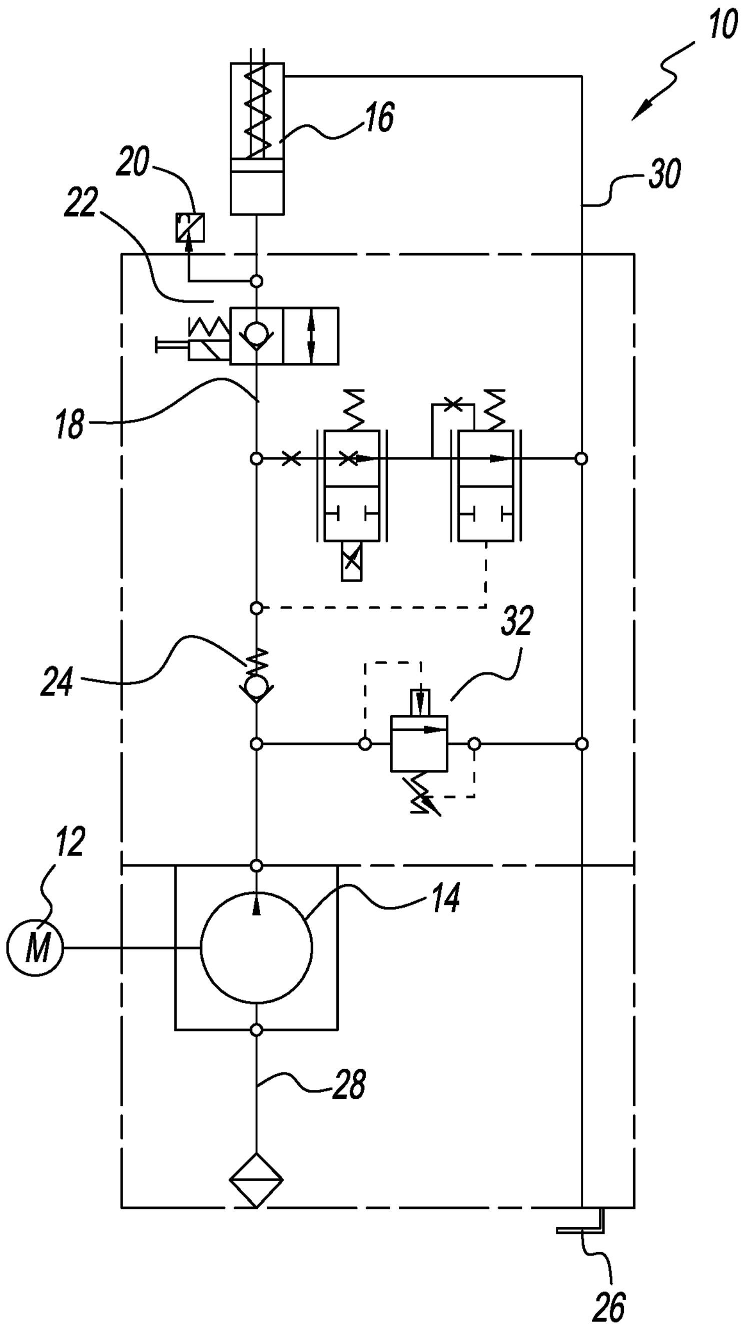
FIG. 3 is a schematic diagram of a hydraulic control system in a de-energized state.

With reference to the figures a hydraulic control system for linear actuation 10 includes an electric motor 12 connected to a hydraulic pump 14. The pump 14 is connected to a hydraulic cylinder 16 by flow line 18. Connected between the pump 14 and cylinder 16 on the flow line 18 is a pressure transducer 20, a pressure control valve 22, and a check valve 24. The pump 14 is also connected to a tank 26 via flow line 28.

The cylinder 16 is connected to the tank 26 by return line 30. Connected between flow line 18 and return line 30 is a control valve 32. Control valve 32 is connected to flow line 18 between check valve 24 and pump 14. Also connected between flow line 18 and return line 30 is a proportional control valve 34. The proportional control valve 34 is connected to the flow line 18 between the check valve 24 and the pressure control valve 22.

The proportional control valve 34 is connected to a processor 36 having software 38. Also connected to the processor 36 is an operator command 40 such as a joystick command. Also, a speed sensor 42 is attached to the pump 14 and or the prime mover shaft. A common approach to achieve proportional speed control and load independent control is to use a proportional flow control valve together with a hydraulic compensator where the proportional control valve controls the flow rate, or lower speed, and the hydraulic compensator maintains the speed regardless of the load weight.

In one example of the present system, the pressure transducer 20 is used to estimate the pressure in the cylinder 16. Thus, the hydraulic compensator may be eliminated and the software 38 is used to change the proportional control valve's 34 opening area to maintain the speed regardless of load weight.

In operation, for startup from zero pump speed, if the pump 14 is not already running and the platform is commanded to lift, it is impossible to reach any pump speed without first passing through the lower area of the pump speed range which is outside of the operating envelope. However, to minimize damage to the pump 14 to the greatest extent, the following steps are performed to minimize the pump pressure at these low speeds.

Figure 7:
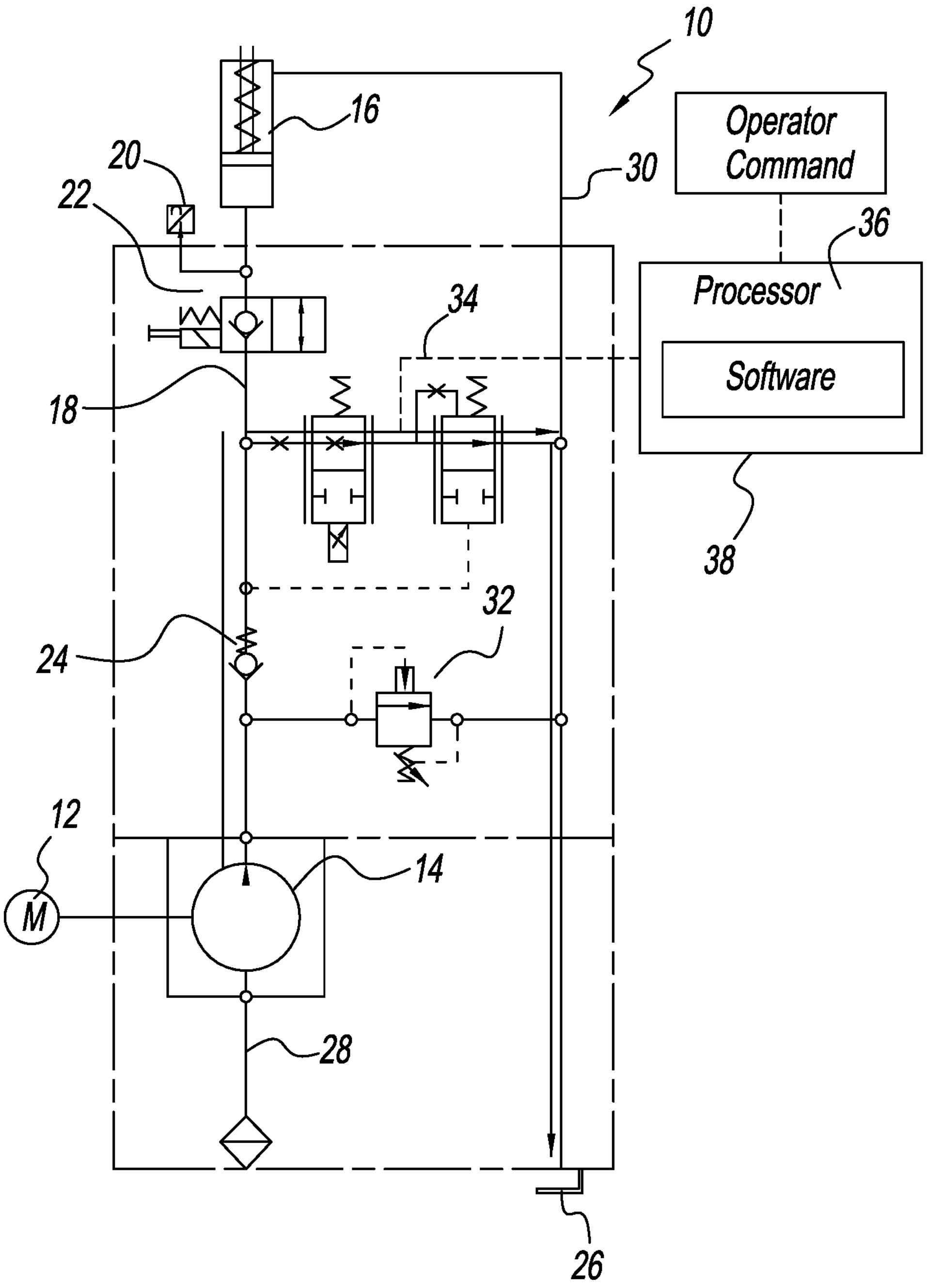
FIG. 7 is a schematic diagram of a hydraulic control system during startup of a lifting command.

First, before energizing the proportional flow control valve 34 to close, the pump speed is increased to the level corresponding to the command cylinder extension rate or the minimum allowed pump speed, whichever value is greater. As the pump rotates, its generated flow has an open, low-resistance pathway through the flow control valve 34 directly to the reservoir 26 as shown in FIG. 7. By bypassing all flow to the reservoir during startup, the pump 14 is able to ramp up in speed with minimal pressure at its output port. This minimizes the potential for damage to the pump during startup.

In operation at the commanded lifting speed, the next step depends on the magnitude of the lifting speed command by the operator. For commanded lifting speeds requiring pump speeds less than the minimum operating speed of the pump 14, the following steps are performed.

Once the minimum operating speed for the pump has been reached, the proportional flow control valve 34 is energized to become partially closed, to the position that bypasses a specific fraction of the pump flow away from the cylinder 16 and directly to the reservoir 26. The fraction of generated pump flow that does proceed to the cap end of the cylinder 16 produces the platform lifting speed that is desired. The flow control valve 22 should be ramped closed at a configurable rate that produces the desired acceleration rate of the cylinder 16.

Figure 8:
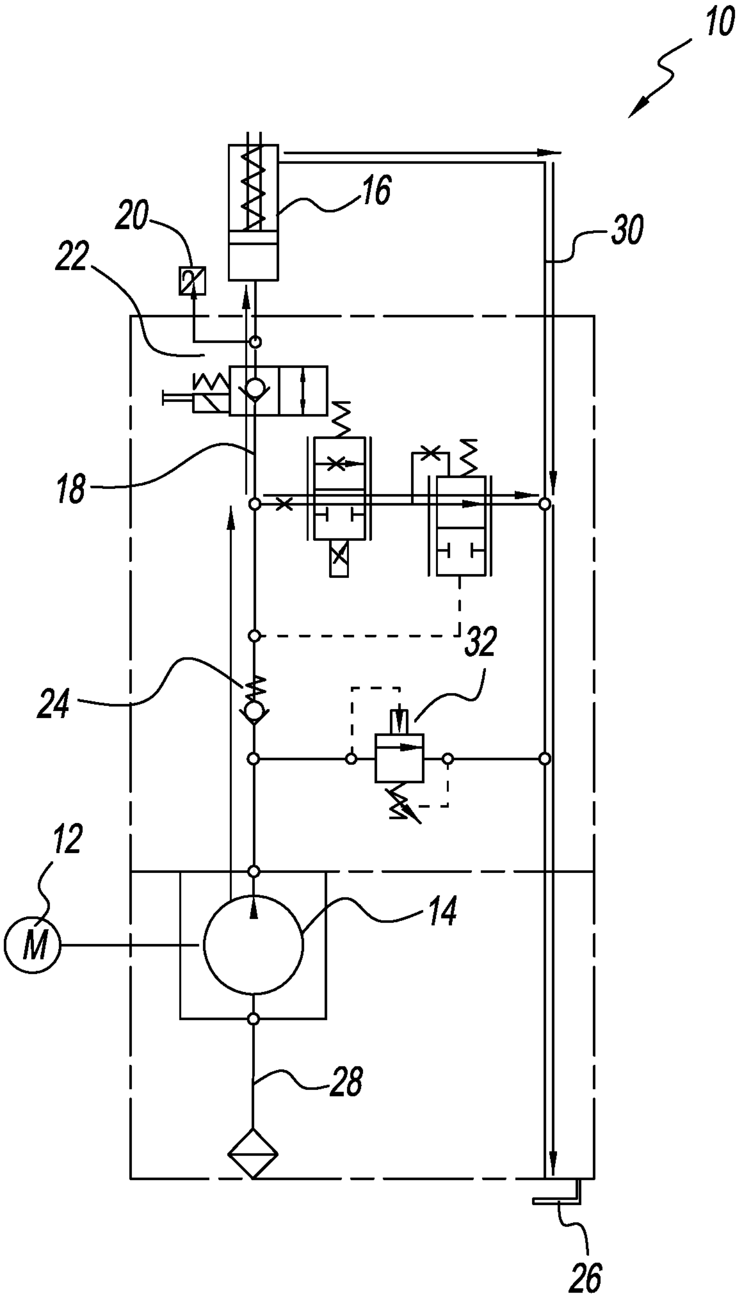
FIG. 8 is a schematic diagram of a hydraulic control system during operation at commanded lifting speeds requiring pump speeds less than the minimum pump operating speed.

The system state in this condition is shown in FIG. 8, where the flow control valve 22 is at a position between fully closed and fully open, and the arrows show that the generated pump flow is split between the cylinder and the reservoir. Since the proportional flow control valve is pressure compensated with the pressure compensated valve 44, it is possible to control the flow independent of the system pressure.

This method for lifting the platform at commanded speeds requiring pump speeds less than the minimum operating speed of the pump applies whether the pump 14 is being ramped up from zero speed or whether it needs to be ramped down from some greater speed where it is already operating. Although this method intentionally converts some energy into heat in order to achieve low lifting speeds, operation at these speeds is normally brief and intermittent. This could be seen as inefficient, but the relatively small amount of extra energy consumed to achieve lower lifting speeds increases the controllability of the machine.

Figure 4:
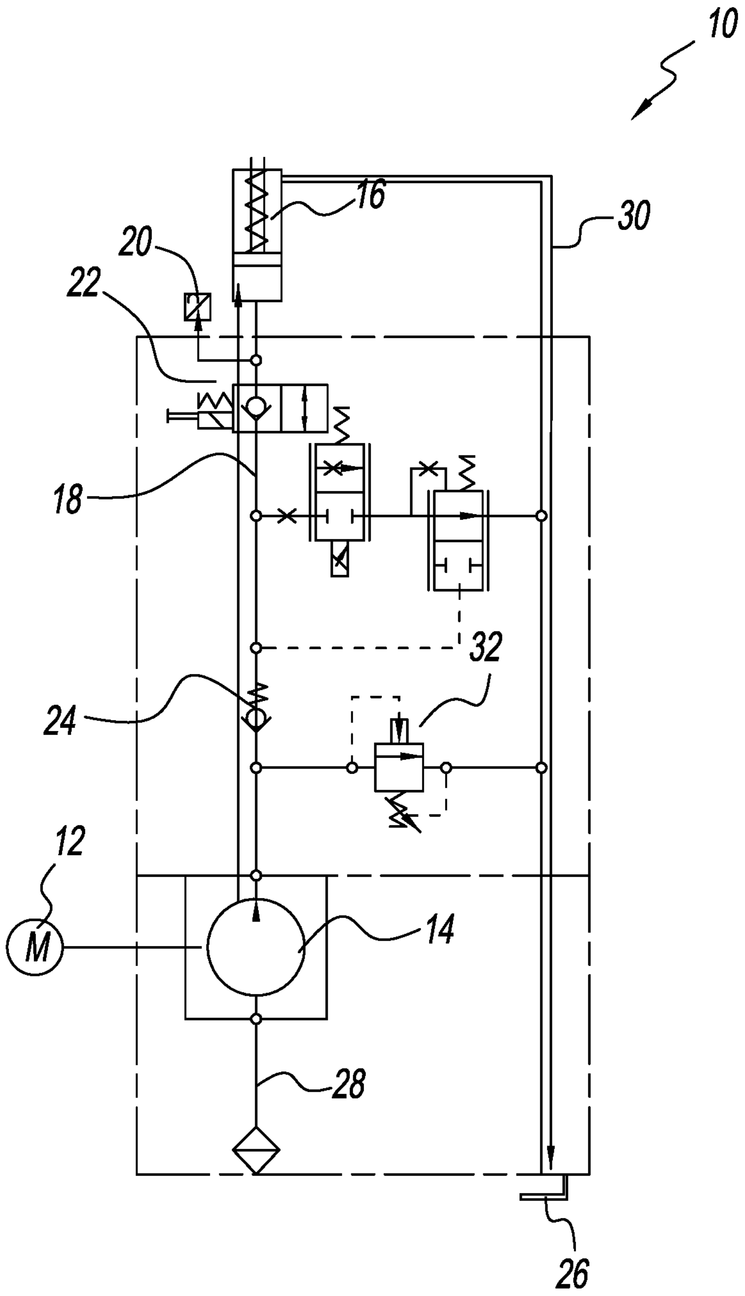
FIG. 4 is a schematic diagram of a hydraulic control system during lifting.
Figure 5:
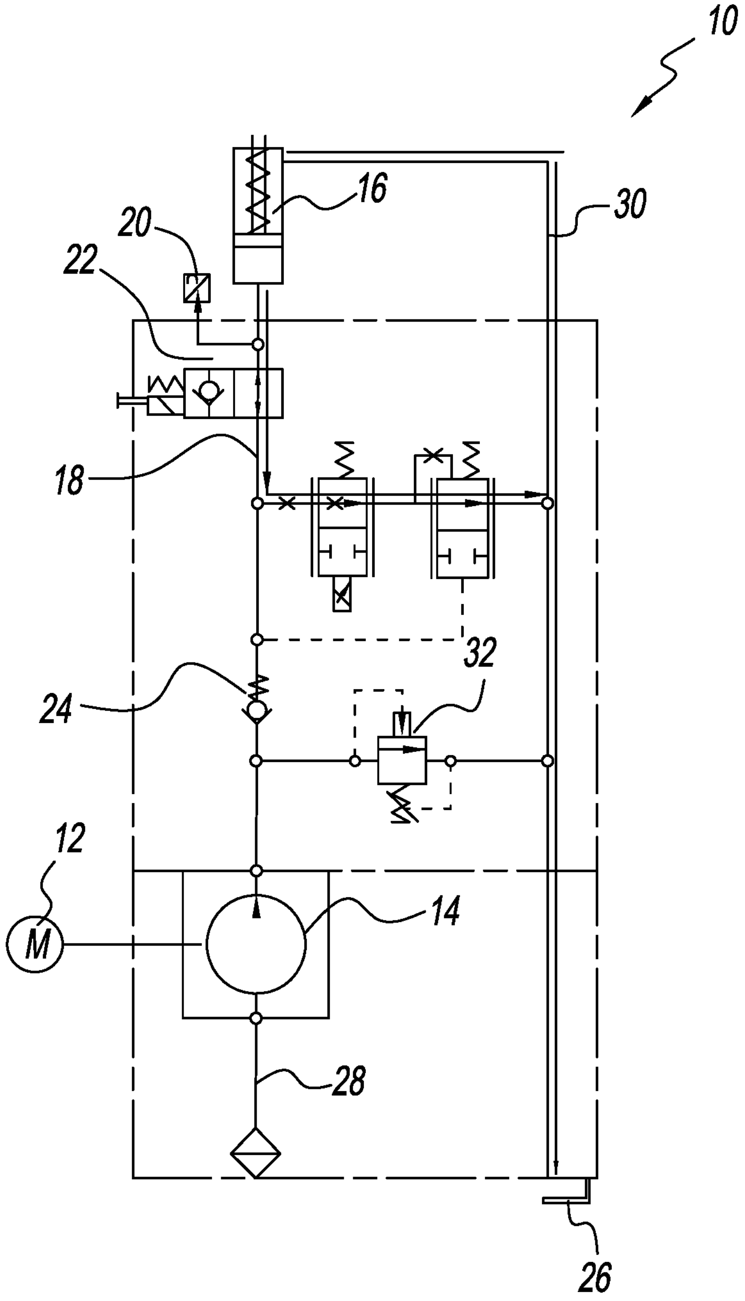
FIG. 5 is a schematic diagram of a hydraulic control system during lowering.
Figure 6:
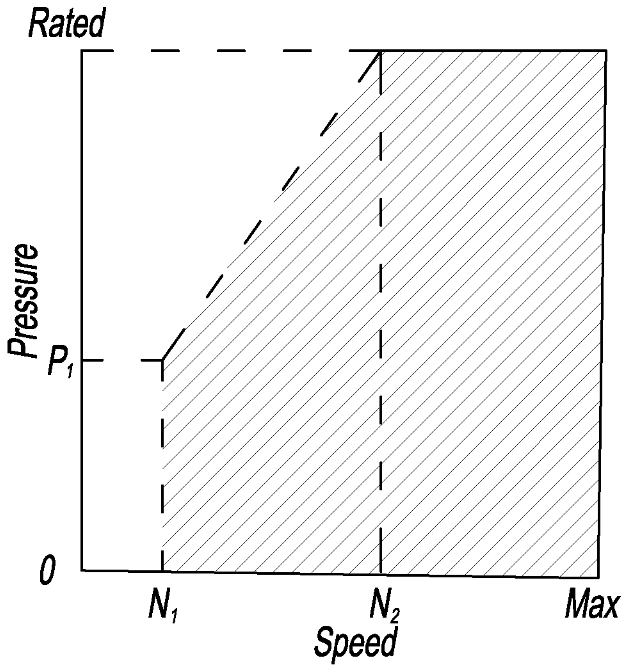
FIG. 6 is a chart of an operating envelope for a pump comparing pump pressure and speed of a pump.

For commanded lifting speeds requiring pump speeds greater than or equal to the minimum operating speed of the pump 14 the following steps are performed. Once the minimum operating speed for the pump has been reached, the flow control valve 34 is energized to become completely closed and to direct all pump flow to the cylinder 16 as shown in FIG. 4. The valve 34 should be ramped closed at a configurable rate that produces the desired acceleration rate of the cylinder 16. While the flow control valve closes, the pump speed continues to increase to the level required based on the lifting speed command.

It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A hydraulic control system for linear actuation, comprising:

an electric motor connected to a hydraulic pump;

a hydraulic cylinder connected to the pump via a flow line;

a pressure transducer, a pressure control valve, and a check valve connected to the flow line between the pump and the cylinder;

a tank connected to the pump and to the cylinder via a return line;

a control valve connected to the flow line between the check valve 24 and the pump and also connected to the return line;

a proportional control valve connected to the flow line between the check valve and the pressure control valve and also connected to the return line; and the proportional control valve connected to a processor having software to control the system state during startup of lifting command and during operation at commanded lifting speeds requiring pump speeds less than the minimum pump operating speed;

wherein the software of the processor, before energizing the proportional flow control valve to close, provides instructions to increase pump speed to a level corresponding to a greater value of a command cylinder extension rate or a minimum allowed pump speed.

2. The system of claim 1 wherein the software of the processor provides instruction for all flow to be bypassed to the tank during startup through the proportional flow control valve.

3. The system of claim 1 wherein the software of the processor, once an operating speed for the pump has been reached, provides instructions to energize the proportional control valve to become partially opened to a position that bypasses a fraction of the pump flow away from the cylinder directly to the tank.

4. The system of claim 3 wherein a remaining fraction of the pump flow proceeds to the cylinder.

5. The system of claim 1 wherein the software of the processor, at commanded speeds requiring speeds less than a minimum operating speed of the pump, provides instructions to apply flow regardless of whether speed needs to be ramped up or ramped down.

6. The system of claim 1 wherein the software of the processor, once a minimum operating speed for the pump has been reached, provides instructions to energize the proportional control valve to become completely closed to direct all pump flow to the cylinder.

7. They system of claim 6 wherein the proportional control valve is ramped closed at a configurable rate to produce a desired acceleration rate of the cylinder.

8. They system of claim 6 wherein as the proportional control valve closes, the software of the processor provides instruction to increase pump speed to a level required based on a lifting speed command.

9. A hydraulic control system for linear actuation, comprising:

an electric motor connected to a hydraulic pump;

a hydraulic cylinder connected to the pump via a flow line;

a pressure transducer, a pressure control valve, and a check valve connected to the flow line between the pump and the cylinder;

a tank connected to the pump and to the cylinder via a return line;

a control valve connected to the flow line between the check valve and the pump and also connected to the return line;

a proportional control valve connected to the flow line between the check valve and the pressure control valve and also connected to the return line; and the proportional control valve connected to a processor having software to control the system state during startup of lifting command and during operation at commanded lifting speeds requiring pump speeds less than the minimum pump operating speed;

wherein the software of the processor provides instruction for all flow to be bypassed to the tank during startup through the proportional flow control valve.

10. The system of claim 9 wherein the software of the processor, once an operating speed for the pump has been reached, provides instructions to energize the proportional control valve to become partially opened to a position that bypasses a fraction of the pump flow away from the cylinder directly to the tank.

11. The system of claim 10 wherein a remaining fraction of the pump flow proceeds to the cylinder.

12. The system of claim 9 wherein the software of the processor, at commanded speeds requiring speeds less than a minimum operating speed of the pump, provides instructions to apply flow regardless of whether speed needs to be ramped up or ramped down.

13. The system of claim 9 wherein the software of the processor, once a minimum operating speed for the pump has been reached, provides instructions to energize the proportional control valve to become completely closed to direct all pump flow to the cylinder.

14. The system of claim 13 wherein the proportional control valve is ramped closed at a configurable rate to produce a desired acceleration rate of the cylinder.

15. The system of claim 13 wherein as the proportional control valve closes, the software of the processor provides instruction to increase pump speed to a level required based on a lifting speed command.

16. A hydraulic control system for linear actuation, comprising:

an electric motor connected to a hydraulic pump;

a hydraulic cylinder connected to the pump via a flow line;

a pressure transducer, a pressure control valve, and a check valve connected to the flow line between the pump and the cylinder;

a tank connected to the pump and to the cylinder via a return line;

a control valve connected to the flow line between the check valve and the pump and also connected to the return line;

a proportional control valve connected to the flow line between the check valve and the pressure control valve and also connected to the return line; and the proportional control valve connected to a processor having software to control the system state during startup of lifting command and during operation at commanded lifting speeds requiring pump speeds less than the minimum pump operating speed;

wherein the software of the processor, at commanded speeds requiring speeds less than a minimum operating speed of the pump, provides instructions to apply flow regardless of whether speed needs to be ramped up or ramped down.

17. The system of claim 16 wherein the software of the processor, once a minimum operating speed for the pump has been reached, provides instructions to energize the proportional control valve to become completely closed to direct all pump flow to the cylinder.

18. The system of claim 17 wherein the proportional control valve is ramped closed at a configurable rate to produce a desired acceleration rate of the cylinder.

19. The system of claim 17 wherein as the proportional control valve closes, the software of the processor provides instruction to increase pump speed to a level required based on a lifting speed command.

20. A hydraulic control system for linear actuation, comprising:

an electric motor connected to a hydraulic pump;

a hydraulic cylinder connected to the pump via a flow line;

a pressure transducer, a pressure control valve, and a check valve connected to the flow line between the pump and the cylinder;

a tank connected to the pump and to the cylinder via a return line;

a control valve connected to the flow line between the check valve and the pump and also connected to the return line;

a proportional control valve connected to the flow line between the check valve and the pressure control valve and also connected to the return line; and the proportional control valve connected to a processor having software to control the system state during startup of lifting command and during operation at commanded lifting speeds requiring pump speeds less than the minimum pump operating speed;

wherein the software of the processor, once an operating speed for the pump has been reached, provides instructions to energize the proportional control valve to become partially opened to a position that bypasses a fraction of the pump flow away from the cylinder directly to the tank.

* * * * *